(12) United States Patent
Moenkemoeller

(10) Patent No.: US 11,536,596 B2
(45) Date of Patent: Dec. 27, 2022

(54) SENSOR FOR DETECTING ENVIRONMENTAL PARAMETERS AND METHOD OF CALIBRATING THE SENSOR

(71) Applicant: paragon ag, Delbrueck (DE)

(72) Inventor: Ralf Moenkemoeller, Bielefeld (DE)

(73) Assignee: PARAGON AG, Delbrueck (DE)

( * ) Notice: Subject to any disclaimer, the term of this patent is extended or adjusted under 35 U.S.C. 154(b) by 548 days.

(21) Appl. No.: 16/067,673

(22) PCT Filed: Dec. 7, 2016

(86) PCT No.: PCT/EP2016/002054
§ 371 (c)(1),
(2) Date: Jul. 2, 2018

(87) PCT Pub. No.: WO2017/129208
PCT Pub. Date: Aug. 3, 2017

(65) Prior Publication Data
US 2019/0003863 A1 Jan. 3, 2019

(30) Foreign Application Priority Data
Jan. 27, 2016 (DE) .......................... 102016000828.8

(51) Int. Cl.
*G01D 18/00* (2006.01)
*G01D 21/00* (2006.01)

(52) U.S. Cl.
CPC .............. *G01D 18/00* (2013.01); *G01D 21/00* (2013.01)

(58) Field of Classification Search
CPC ........... G01D 18/00; G01D 21/02; G01D 9/00
See application file for complete search history.

(56) References Cited

U.S. PATENT DOCUMENTS

| | | | | |
|---|---|---|---|---|
| 2013/0332085 A1* | 12/2013 | Yang | .................. | A61B 5/14532 702/22 |
| 2014/0200840 A1* | 7/2014 | Cox | ....................... | G01D 18/00 702/104 |

FOREIGN PATENT DOCUMENTS

| | | | |
|---|---|---|---|
| CN | 104279034 | * | 1/2015 |
| DE | 102014211074 A | | 12/2015 |
| DE | 102014211074 A1 | * | 12/2015 |
| WO | WO 2013/045927 | * | 12/2013 |

* cited by examiner

*Primary Examiner* — Catherine T. Rastovski
(74) *Attorney, Agent, or Firm* — Andrew Wilford

(57) ABSTRACT

The invention relates to a sensor (1) for detecting environmental parameters, comprising a transmission device (3) by means of which an output signal of the sensor (1) can be emitted, and a correction device (4) by means of which the sensor measurement value can be corrected for the emission of a correct output signal, which sensor is to be easy to produce, and wherein only a small output is to be required for a method for calibrating a sensor of this type. According to the invention, the sensor is calibrated by means of the correction device thereof, on the basis of cloud-based data.

11 Claims, 1 Drawing Sheet

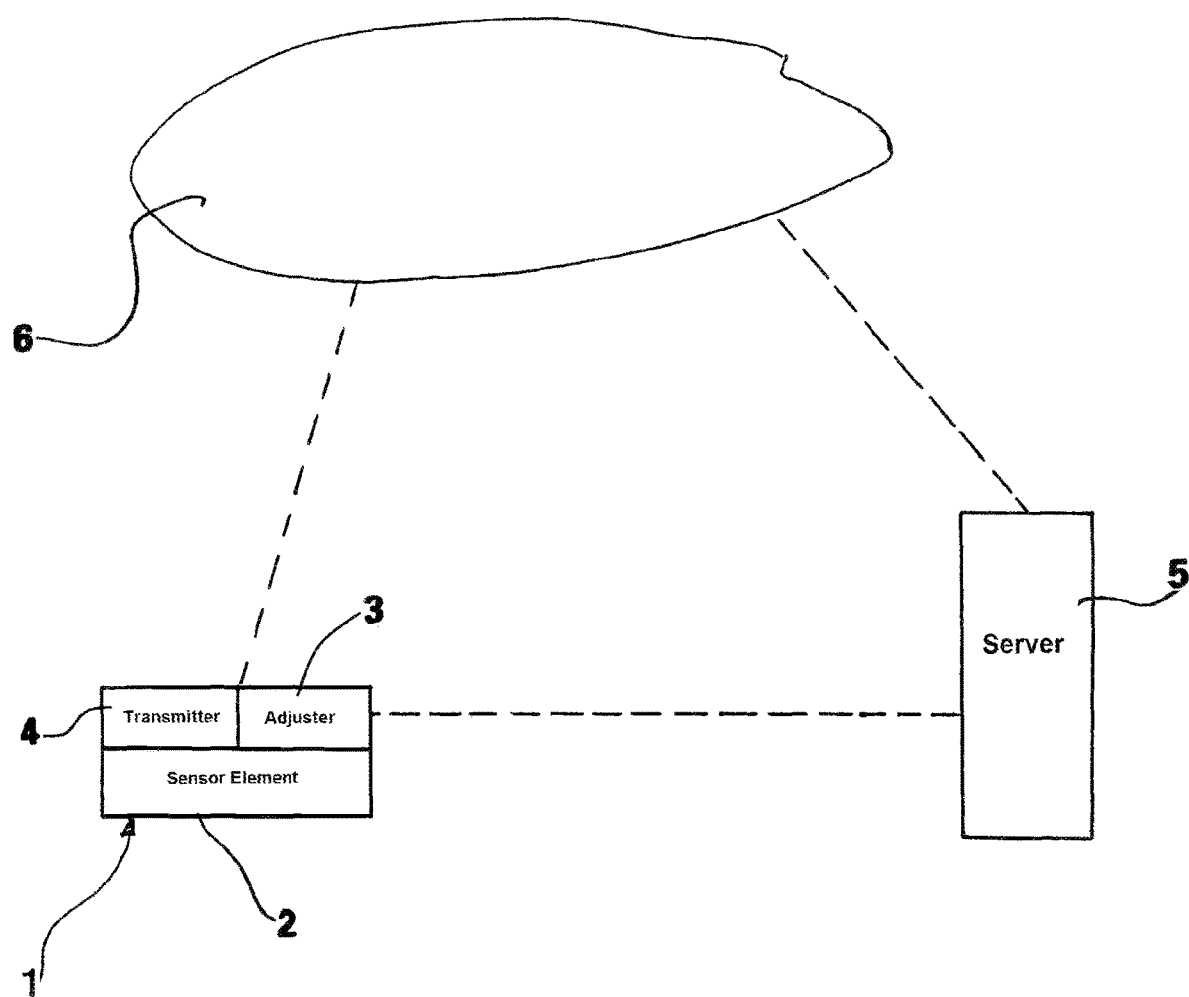

SENSOR FOR DETECTING ENVIRONMENTAL PARAMETERS AND METHOD OF CALIBRATING THE SENSOR

CROSS REFERENCE TO RELATED APPLICATIONS

This application is the US-national stage of PCT application PCT/EP2016/002054 filed 7 Dec. 2016 and claiming the priority of German patent application 102016000828.8 itself filed 27 Jan. 2016.

FIELD OF THE INVENTION

The invention relates to a sensor for detecting environmental parameters, comprising a transmitter that can emit an output signal of the sensor and an adjustment device that can adjust the sensor measurement for the emission of a correct output signal and to a method of calibrating sensors of this kind.

BACKGROUND OF THE INVENTION

Sensors of this kind for detecting environmental parameters have been commonplace for some time and are used for a large variety of purposes. The aim is to produce sensors of this kind for detecting environmental parameters at the lowest possible economic cost, wherein reliable functionality of these sensors should be guaranteed over the longest possible period of use.

Due to cost considerations, low-price sensor elements, for example moisture sensors, temperature sensors, etc., are used in low-cost sensors. These usually have an inadequate or low level of accuracy.

Calibration is performed in order to increase the accuracy of the sensor that usually includes a sensor element, signal processing and an interface. The adjustment values in this case are determined and stored individually for each sensor. Using the stored adjustment values, the sensor measurement of the sensor can be adjusted in such a manner that the output signal emitted by the sensor has a greater accuracy and therefore quality.

The problem in this case is that methods for calibration known from the state of the art are associated with substantial effort and expense. Particularly among users of these sensors, there is no, or only low, acceptance of routine calibration of the sensors.

In this case, the degradation of sensors of this kind over their service life is, in particular, fraught with problems, since in the absence of accurate and expensive calibration devices and methods known from the state of the art, the quality of measurements taken by such sensors deteriorates considerably as the period of use increases. Reasons for the degradation of sensors of this kind include, for example, dirt and contamination of the actual sensor elements of such sensors.

OBJECT OF THE INVENTION

Based on the state of the art as set out above, the object of the invention is to provide sensors for detecting environmental parameters, including mobile and networked sensors of this kind, in which it is guaranteed without any great technical design effort or expense that the measurements supplied by these sensors are as accurate as possible over a long service life or useful life.

SUMMARY OF THE INVENTION

This object is attained by a sensor for detecting environmental parameters using a transmitting device that can emit an output signal of the sensor and an adjustment device that can adjust the sensor measurement for the emission of a correct output signal, in that the sensor can be calibrated by means of its adjustment device on the basis of cloud-based data. With regard to the method of the calibration of sensors for detecting environmental parameters, in which the sensor is calibrated for the emission of correct output signals, the solution is that the sensor is calibrated on the basis of cloud-based data.

The storage location of the adjustment data may be in the sensor or in the cloud. If the data are stored in the sensor, the measurements can also be adjusted in the sensor without accessing the cloud, offline in other words.

If the adjustment values are stored in the cloud or on a server, the sensor requires access to the cloud or a server in order to generate an adjusted measurement. The sensor either receives the necessary adjustment value from the server or the measurement that has already been adjusted straight from a service on the server that can then be directly emitted.

A sensor of this kind is advantageously assigned a server that can access to the cloud-based data, adjustment data for the sensor can be determined from the cloud-based data and the adjustment data determined can be passed on to the sensor or the adjustment device thereof. The output signal emitted by the sensor can then be adjusted following an adjustment based on the adjustment data conveyed to the sensor.

In accordance with an advantageous development of the sensor according to the invention, on the server assigned to it based on the adjustment data determined, the output signal of the sensor can be adjusted and the adjusted output signal made available to the sensor.

The adjustment data can advantageously be determined and stored on the sensor from its output signal and the adjusted output signal made available to it.

According to a further advantageous embodiment, cloud-based data can be accessed by means of the sensor and the adjustment data of the sensor can be determined on the basis of the cloud-based data.

So that a weighting of the measuring signals of a sensor of this kind can be performed in a goal-oriented manner, it is advantageous for the output signal of the sensor to be able to be assigned a characteristic value for signal quality. Accordingly, the measurement determined by a sensor of this kind can then be used in the calculation or determination of an environmental parameter according to the signal quality assigned to the sensor or the measurement thereof.

With an embodiment of the method according to the invention for the calibration of sensors used to detect environmental parameters, the cloud-based data are data records stored according to sensor identification, time and place, preferably of a plurality of identical sensors of this kind.

With a method of this kind according to the invention, it is advantageous for the output signal of the respective sensor to undergo a plausibility check based on the cloud-based data.

According to an advantageous development of the method according to the invention, on the basis of cloud-based data adjustment data for the output signal of the respective sensor are determined and this sensor is calibrated on the basis of these adjustment data.

The adjustment data are advantageously storable in the sensor.

For weighting the output signal of the respective sensor, it is advantageous for this output signal is to be assigned a characteristic value for signal quality.

In a further embodiment of the method according to the invention, a cloud-based service receives the sensor data, determines the adjustment values for this sensor, but does not transmit this back to the sensor and instead uses these adjustment data only for further processing the measurements in the cloud. The user or carrier of the sensor does not therefore acquire improved long-term stability of the measurements shown to them. The adjusted measurements to be further processed in the cloud have a greater accuracy and quality, however.

BRIEF DESCRIPTION OF THE DRAWING

The invention is explained in greater detail below with the help of embodiments with reference to the drawing whose sole FIGURE depicts an embodiment of a method according to the invention for calibration of sensors for detecting environmental parameters.

SPECIFIC DESCRIPTION OF THE INVENTION

A sensor 1 according to the invention described below with the help of the single FIGURE, which sensor can be calibrated using a method according to the invention for the calibration of sensors 1 for detecting environmental parameters, has a sensor element 2 with which the environmental parameter to be detected can be measured.

The environmental parameter to be detected or monitored may be, for example, ozone, $NO_x$, CO, $CO_2$ concentrations, air temperature, humidity, solar radiation, UV (ultraviolet) radiation, dust load, position, speed, etc. The list of environmental parameters referred to above is only given by way of example. A plurality of other environmental parameters can be detected or monitored using sensors 1 fitted with correspondingly designed sensor elements 2.

Sensors 1 of this kind may be permanently installed in buildings or measuring stations, for example. They may also be provided as mobile sensors, for example in vehicles or mobile phones. The embodiment as "wearables", for example in items of clothing, is also possible.

Most sensors 1 of this kind used to detect environmental parameters detect the respective environmental parameters or data, in order to supply the owners or a community with these measurements.

Access to processed and, for example, visualized measurements from a large number of sensors 1 of this kind for detecting environmental parameters is then provided to a community by means of a cloud-based device, for example.

With a procedure or a method of this kind, based on the present temperature data and the likewise present positional data of the sensors 1 detecting these temperature data over a geographical range, for example a town or a region of numerous distributed—including mobile—sensors 1, a temperature map for the town or region concerned can be created and made accessible.

Similarly, a map depicting the air quality of a town or region can be made available so that a user is able to avoid areas with currently high concentrations of harmful substances, for example.

Sensor 1 includes a transmitting device 3 and an adjustment device 4. By means of the transmitting device 3, an output signal of the sensor 1 can be emitted. By means of the adjustment device 4 the sensor 1 can be calibrated to emit an adjusted output signal.

Sensor calibration by means of the adjustment device 4 is achieved in that one or more adjustment values or adjustment functions for the sensor measurement or the output signal of the sensor 1 are calculated for the sensor 1. These adjustment values or adjustment functions are referred to below as "adjustment data".

These adjustment data are calculated in the embodiment of the invention shown in the FIGURE on a server 5 by a "community-based (CB) service". With a CB service the measurement data from a large number of sensors 1 of this kind—including mobile sensors—is gathered and stored as data records along with the respective identification of the sensor 1, the time and the place of the measurement.

With an adequately large number of sensors 1 of this kind and corresponding sensor data records associated therewith, the aforementioned CB service can calculate or estimate on the basis thereof the extent to which the measurement data of a sensor 1 correlate with those of other corresponding sensors 1 in time and place.

Accordingly, the adjustment data can then be re-determined for the respective sensor 1 by means of current calculations.

The adjustment data thereby determined or calculated are taken into account by the CB service when processing the measurement data of the respective sensor 1 before the output signals of the sensor 1 are visualized and published.

Insofar as there is a bidirectional connection to the sensor 1, these adjustment data are also supplied to the sensor 1. They can be supplied to the sensor 1 by the server 5 or the CB service. The exchange of adjustment data can take place directly over the air or also through a wired connection.

The adjustment data can be stored in sensor 1. An adjustment of the output signals of the sensor 1 is then possible in offline mode too. The adjustment data are then applied to the measurement data thereof in sensor 1. The correspondingly adjusted measurement data are then supplied to the users or the community in the cloud 6.

Alternatively, the sensor 1 may supply its non-adjusted measurement data and the adjustment data.

It is also possible for the sensor 1 to supply its unadjusted measurement data and the CB service the adjustment data of the respective sensor 1 to the community.

With its adjusted or unadjusted measurement data, the sensor 1 can supply a QoS (Quality of Service) indicator assigned to it, which is a characteristic value for the signal quality. This QoS indicator may be supplied by the sensor 1 and/or managed in a database. This QoS indicator may be assigned to an individual sensor 1 or a group of sensors 1.

If the sensor 1 is a low-cost sensor, this sensor 1 may initially be assigned a mean QoS indicator, for example, such as a 5 in a range of values from 0 to 10. After a long service life or operating time without calibration, the QoS indicator can be lowered to a value below 5. Following calibration, the QoS indicator can be increased again to a higher value.

If the sensor 1 is a high-value sensor, for example a calibrated sensor, this sensor 1 may initially be assigned a high QoS indicator, for example of 10 in the aforementioned range of values from 0 to 10. After a long service life or operating time without calibration, this QoS indicator can then be lowered to a value below 10. Following calibration, the QoS indicator can once again be increased to a higher value.

The QoS indicators assigned to the respective sensors 1 are then decisive in relation to the extent to which the measurements or output signals of the respective sensors 1 are included in the total calculation of the environmental parameter value concerned.

The invention claimed is:

1. A sensor for detecting environmental parameters and generating an output signal corresponding thereto and having a quality-of-service indicator of signal quality, the sensor comprising:
    a transmitter that can emit the output signal of the sensor, and
    an adjustment device for adjusting a sensor measurement by emitting a correct output signal for initial calibration of the sensor by the adjustment device on the basis of cloud-based data by
        initially setting the quality-of-service indicator to a characteristic value and, after a predetermined operating time without calibration, lowering the quality-of-service indicator below the characteristic value, and
        after calibration resetting the quality-of-service indicator to a value above the characteristic value.

2. The sensor according to claim 1, further comprising in combination with the sensor:
    a server for accessing the cloud-based data for determining adjustment data for the sensor from the cloud-based data and for passing the determined adjustment data to the sensor or to the adjustment device thereof.

3. The sensor according to claim 2, wherein the sensor measurement of the sensor is adjustable on the server based on the determined adjustment data and the server makes the adjusted output signal available to the sensor.

4. The sensor according to claim 3, wherein the adjustment data can be determined and stored from the sensor measurement and the adjusted output signal made available to the sensor.

5. The sensor according to claim 1, wherein the cloud-based data is accessed and the adjustment data is determined on the basis of the accessed cloud-based data.

6. A method of calibrating a sensor for detecting environmental parameters, the method comprising the steps of:
    initially calibrating the sensor for emitting correct output signals on the basis of cloud-based data having a quality-of-service indicator set to the characteristic value, and,
    after a predetermined operating time without calibration, lowering the quality-of-service indicator below the characteristic value, and after calibration resetting the quality-of-service indicator above the characteristic value.

7. The method according to claim 6, further comprising the step of:
    storing the cloud-based data as data records according to sensor identification, time and place of a plurality of identical sensors.

8. The method according to claim 6, further comprising the step of:
    subjecting the correct output signals of the sensor to a plausibility check based on the cloud-based data.

9. The method according to claim 6, wherein the step of initially calibrating the sensor also includes the substep of:
    determining adjustment data for the correct output signals of the sensor and subsequently
    calibrating the sensor on the basis of the determined adjustment data.

10. The method according to claim 9, further comprising the step of:
    storing the adjustment data in the sensor.

11. The method according to claim 6, further comprising the steps prior to initially calibrating the sensor of:
    receiving sensor data from a cloud-based service,
    determining adjustment data for the sensor from the sensor data received from the cloud-based service, and
    using the determined adjustment data for the further processing in the cloud of sensor data of the sensor.

* * * * *